United States Patent
Di Giamberardino et al.

(10) Patent No.: US 9,402,061 B2
(45) Date of Patent: Jul. 26, 2016

(54) SMART OPTICAL SENSOR FOR ADAPTIVE, PREDICTIVE, AND ON-DEMAND CONTROL OF PUBLIC LIGHTING

(71) Applicant: SMART-I, S.R.L., Rome (IT)

(72) Inventors: Mauro Di Giamberardino, Rome (IT); Gabriele Randelli, Rome (IT)

(*) Notice: Subject to any disclaimer, the term of this patent is extended or adjusted under 35 U.S.C. 154(b) by 0 days.

(21) Appl. No.: 14/781,734

(22) PCT Filed: May 8, 2014

(86) PCT No.: PCT/IT2014/000121
§ 371 (c)(1),
(2) Date: Oct. 1, 2015

(87) PCT Pub. No.: WO2014/181369
PCT Pub. Date: Nov. 13, 2014

(65) Prior Publication Data
US 2016/0050397 A1    Feb. 18, 2016

(30) Foreign Application Priority Data

May 8, 2013 (IT) .............................. RM2013A0274

(51) Int. Cl.
| | |
|---|---|
| H05B 37/02 | (2006.01) |
| H04N 7/18 | (2006.01) |
| G06T 7/20 | (2006.01) |
| H04N 5/225 | (2006.01) |

(52) U.S. Cl.
CPC ........ *H04N 7/183* (2013.01); *G06T 7/20* (2013.01); *H04N 5/2252* (2013.01); *H05B 37/0218* (2013.01); *H05B 37/0227* (2013.01); *H05B 37/0245* (2013.01); *G06T 2207/30236* (2013.01); *Y02B 20/48* (2013.01); *Y02B 20/72* (2013.01)

(58) Field of Classification Search
None
See application file for complete search history.

(56) References Cited

U.S. PATENT DOCUMENTS

| | | | | |
|---|---|---|---|---|
| 7,102,496 | B1* | 9/2006 | Ernst, Jr. ............... | G08G 1/164 180/167 |
| 7,315,241 | B1* | 1/2008 | Daily .................... | G02B 27/01 340/332 |
| 8,193,929 | B1* | 6/2012 | Siu ....................... | H04L 12/2829 340/538 |
| 9,286,516 | B2* | 3/2016 | Bulan .................. | G06K 9/00624 |
| 2005/0072907 | A1* | 4/2005 | Pallaro ................. | G01J 1/4228 250/215 |
| 2005/0110621 | A1* | 5/2005 | Hahn ..................... | B60R 1/00 340/435 |
| 2007/0228262 | A1* | 10/2007 | Cantin ................... | G01P 13/00 250/221 |
| 2009/0002141 | A1* | 1/2009 | Rinaldi .................. | B60R 1/00 340/425.5 |
| 2009/0072945 | A1* | 3/2009 | Pan ...................... | H05B 37/0218 340/5.1 |
| 2010/0259197 | A1* | 10/2010 | Boleko Ribas ...... | H05B 37/029 315/312 |
| 2010/0283393 | A1* | 11/2010 | Boleko Ribas ...... | H05B 37/029 315/152 |

(Continued)

FOREIGN PATENT DOCUMENTS

| | | |
|---|---|---|
| WO | 2012140152 A1 | 10/2012 |
| WO | 2012143814 A1 | 10/2012 |

*Primary Examiner* — Crystal L Hammond

(57) ABSTRACT

The subject of the present invention is a system characterized by a distributed network of smart optical sensors for adaptive, predictive, and on-demand control of public lighting. The invention pertains to the technical sector of monitoring and video-surveillance installations.

16 Claims, 8 Drawing Sheets

(56) References Cited

U.S. PATENT DOCUMENTS

| | | | |
|---|---|---|---|
| 2011/0001626 A1* | 1/2011 | Yip | H05B 37/0263 340/635 |
| 2011/0006685 A1* | 1/2011 | Kraft | B60Q 1/1423 315/77 |
| 2012/0032594 A1* | 2/2012 | Hagner | B60Q 1/085 315/82 |
| 2012/0086363 A1* | 4/2012 | Golding | H05B 37/00 315/312 |
| 2012/0319597 A1* | 12/2012 | Park | H05B 37/0227 315/154 |
| 2013/0009569 A1* | 1/2013 | Knibbe | H05B 37/0227 315/297 |
| 2013/0069773 A1* | 3/2013 | Li | B60K 28/02 340/426.1 |
| 2013/0257273 A1* | 10/2013 | Nordbruch | B60Q 1/085 315/82 |
| 2014/0028216 A1* | 1/2014 | Wang | H05B 37/0245 315/294 |
| 2014/0084795 A1* | 3/2014 | Cumpston | H05B 37/0272 315/149 |
| 2014/0117852 A1* | 5/2014 | Zhai | H05B 37/0245 315/86 |
| 2014/0375206 A1* | 12/2014 | Holland | H02J 9/061 315/86 |
| 2015/0029039 A1* | 1/2015 | Mukaiyama | G08G 1/096716 340/905 |
| 2015/0035440 A1* | 2/2015 | Spero | B60Q 1/04 315/153 |
| 2015/0351185 A1* | 12/2015 | Montoya Correa | F21V 23/0435 315/149 |

* cited by examiner

SMART OPTICAL SENSOR FOR ADAPTIVE, PREDICTIVE, AND ON-DEMAND CONTROL OF PUBLIC LIGHTING

CROSS-REFERENCE TO RELATED APPLICATION

This application is the 35 U.S.C. §371 national stage application of PCT Application No. PCT/IT2014/000121, filed May 8, 2014, which claims priority to and the benefit of, IT Patent Application No. RM2013A000274, filed May 8, 2013, both of which are herein incorporated by reference in their entirety.

The subject of the present invention is a system characterized by a distributed network of smart optical sensors for adaptive, predictive, and on-demand control of public lighting. The invention pertains to the technical sector of monitoring and video-surveillance installations.

Public lighting is the set of the objects (lamp-posts, lamps, etc.) designed to light up public spaces. In said context, the main type of public lighting is street lighting, the purpose of which is to create conditions of good visibility during evening and night-time hours to guarantee conditions of safety for a person who is at the steering wheel of a vehicle and to render the appearance of towns and villages more attractive. The legislative tool for good street lighting is control of the indirect luminous flux, the purpose of which is to guarantee an adequate degree of luminance for every category of road. "Luminance" is defined as the ratio between the intensity of light emitted by a source in a given direction towards a surface normal to the direction of the luminous flux and the area of the surface itself. The unit of measurement of said quantity is the candle per square meter ($cd/m^2$). Luminance is the only tool deemed valid by current standards, and is thus indispensable.

Design of street lighting in Italy is regulated by the UNI 11248 standard and by the international CIE standards currently in force, amongst which 115-1997, 115-2007, 115-2010, which define the (design and operating) lighting categories for a stretch of road, as well as the lighting parameters of influence of the categories themselves.

The aim of the above legislation is to keep control of the indirect luminous flux to the minimum required by the safety standards to prevent needless waste of energy (over-lighting), at the same time guaranteeing adequate safety.

Application of the above standards has its fulcrum in proper classification of the stretch of road in the design stage. In particular, it is of fundamental importance to identify the parameters of influence applicable to the stretch of road in question. These are in fact parameters that can evolve over time, enabling declassing of a road and thus distinguishing the design lighting category from the operating lighting category. Declassing of the operating lighting category in turn enables reduction of the luminous flux in so far as the minimum degree of luminance required is less than that established by the design lighting category, thus favouring energy saving. There thus emerges clearly the importance of measuring the effective degree of luminance on a stretch of road, and comparing it with the minimum one required by law.

In addition to the aforementioned degree of luminance, the lighting parameters of influence fall into two major categories: road traffic, and weather conditions. Belonging in the first category are parameters such as the variation in traffic flow with respect to what is envisaged by the design lighting category. The variation of traffic flow enables declassing of a stretch of road by one or two units (respectively when the traffic flow is less than 50% or 25% of the maximum traffic flow expected). A further parameter of this sort is the kind of traffic expected (vehicles only, pedestrians only, or mixed) and the risk of aggression in a given stretch of road. Belonging in the second category is, instead, the condition of visual task, which is defined by the standard UNI 10380 of 1994 as the performance of the visual function required by a given activity, i.e., the vision of objects, details, and background connected to the type of task to be performed. The visual task is affected not only by the degree of luminance of the road, but also by the weather conditions (precipitation, fog, light sources that do not guarantee visual comfort, such as dawn or dusk), which alter and reduce the visual contrast between the detail and the background of the scene. For this reason, analysis of the weather conditions is an essential component of proper street lighting. A further parameter linked to environmental and weather conditions is the condition of the road surface (whether wet or dry) and the colour-rendering index (CRI or $R_a$). For values higher than 60, the stretch of road can be declassed by one unit.

The parameters of influence represent the lever with which to declass the stretch of road in the operating stage to favour energy saving.

Notwithstanding this, the very limit of the current approach is that so far the classification of roads, and the consequent level of luminous flux required, is determined exclusively in the design stage and takes into account an a priori modelling, i.e., without considering the actual conditions of the stretch of road or the evolution of the parameters of influence over time. This entails inevitable waste due to energy consumption levels that are higher than necessary, or conversely, a reduction of road security when the lighting is turned off or the scene is under-illuminated, even in the presence of critical situations where it would instead be expedient to increase illumination.

There is thus felt the need and desirability on the part of the bodies responsible for public lighting (such as municipalities) to be able to adopt innovative road-control systems, that will enable adaptive and predictive modulation of the luminous flux according to the variable conditions of the stretch of road in terms of vehicle traffic and/or presence of pedestrians, luminance and weather conditions, analysed in real time, which in turn determine a re-modulation of the lighting category of the road roads with respect to the actual conditions and in a dynamic way over time.

Complementary to this need is the possibility of viewing the public-lighting network according to a new perspective, namely, no longer as a simple passive lighting infrastructure, but as a true sentient network, equipped with smart sensors that are able to provide multiple innovative services and thus improve social and public activities, such as info-mobility services, control of road security and of urban security, and smart control of traffic lights. The state of the art is able to offer various technologies that partially make up for the current limits, but none of them completely meets the standards set down by the legislator for the public-lighting market. A first approach is to insert astronomical clocks in the supply cabinets of the lighting systems, which are able to calculate automatically the time of dawn and dusk of all the days on the basis of the latitude and longitude of the locality. The lighting-up and lighting-down times are thus computed every day with greater precision as compared to traditional approaches. Solutions of this type are far from an adaptive implementation since they are limited to accurate calculation of the period of sunlight when the lamp can be turned off, without taking into account any dynamic factor.

An alternative is the adoption of sensors of various nature for analysis of some of the measurements described by the aforesaid standards. For instance, inductive loops can be used to acquire information on the traffic (see, for example, the U.S. Pat. No. 6,337,640 B2), but they are not able to make any other type of measurement such as that of luminance or weather conditions along the stretch of road. The use, instead, of weather stations (see, for example, patents Nos. CN103278868 A, U.S. Pat. No. 2,287,786 A, U.S. Pat. No. 5,920,827 A) suffers from the limit of not providing traffic data. Furthermore, many of these sensors present the major problem of requiring huge modifications to the road surface (as in the case of inductive loops). Finally, since they are very specific for acquisition of just one type of information, a considerable effort of integration of the various technologies is called for to meet all the measurement requirements, thus increasing the overall cost of the system and the complexity of acquisition of information starting from the measurements (see, for example, patents Nos. CN102881162, CN101739824, CN101729167, WO/2012/140152).

Recently adopted, then, are technologies based upon installation of video sensors, aimed at acquisition of video streams or images regarding the traffic (see patents Nos. KR20130139104, CN203300046, CN203415091). These sensors are connected to the electric power supply available in the lamp-posts themselves, and unlike the other types of sensors are far from invasive, not calling for major installation activities. The sensors in question are, however, for the most part passive ones: they acquire the images and the video streams but do not process them. It is thus necessary to transmit these data to a data-processing centre for subsequent calculation. The disadvantage is that transmission of the data acquired to the remote centre is usually via a wireless cellular infrastructure (e.g., 3G or LTE), with high transmission costs, or via wired infrastructure but with a limited passband, such as powerline communication (PLC) means, which, however, does not enable provision of some types of services (such as video streaming by remote direct control).

Very few products offer, instead, the above functions of analysis directly on board the video sensors themselves. Processing of the images directly on board the sensors would enable minimization of the data to be transmitted remotely, thus reducing the transmission costs thereof. Finally, it should be noted how current video technologies in no case provide an analysis of the luminance of the stretch of road considered, which is one of the basic parameters for lighting classification of the road, and even less, starting from these data, are they able to predict and estimate the future evolution of the lighting parameters of influence. The lack of prediction prevents these systems from being able to regulate public lighting automatically, requiring, instead, a continuous human supervision for control purposes.

A first object of the present invention is to overcome the current limits of video sensors by using a smart optical sensor of a new conception that will carry out automatic continuous monitoring of traffic conditions, weather conditions, and conditions of luminance of a stretch of road. The invention predicts in real time the operating lighting category of the stretch itself on the basis of historic analysis of the parameters of interest, with particular reference (albeit without being limited thereto) to luminance, vehicle and pedestrian traffic, and weather conditions, and of prediction of the evolution of the parameters themselves, and adaptively controls the luminous flux of the corresponding public-lighting system.

The present invention overcomes the existing limits and complexity of the technologies currently present on the market, with particular reference to: increasing energy saving thanks to adaptive, predictive, and on-demand control of public lighting, estimation of the operating lighting category of the stretch of road, automatic analysis of the three conditions required for a proper lighting classification (traffic, weather, and luminance) with the aid of just one type of sensor, reduction of the costs for data transmission to remote centres via embedded processing (directly on board the system according to the invention) of the data acquired, and ease of installation on the lighting system.

A second object of the invention is to guarantee a significant increase in energy saving in public lighting via the adoption of techniques of adaptive, predictive, and on-demand control of lighting. In particular, by "adaptive control" is meant the capacity of the invention to regulate the luminous flux starting from analysis of the historic series linked to the parameters of influence (at least regarding traffic, weather, and luminance conditions) and consequent prediction of the future operating lighting category of the stretch of road itself. "On-demand control", instead, regulates the luminous flux via the prediction of instantaneous significant events, reacting in real time. They both represent the main advantages of the invention as compared to current technologies in so far as they enable the system to adapt public lighting in an automatic and timely way, without any aid from a human operator.

A third object of the invention is to enable provision of multiple services and functions via the use of just the optical sensor. The invention, by means of appropriate software modules, can moreover offer services of urban security, detection of anomalous events, road security, smart parking, traffic-light control, and semantic analysis of the scene.

A fourth object of the invention is to solve the problem of the high costs for transmission of non-processed data currently required by technologies based upon passive optical sensors. This limitation is overcome by the invention thanks to processing of the data acquired by the video camera directly on board the nodes themselves, with consequent extraction of high-level aggregate data, which, since they are much more compact, require a considerably narrower transmission band, thus reducing the costs.

A fifth object of the invention is to guarantee simplicity of installation. The only components to be installed are the sensors themselves. No connection is necessary with the reference electrical cabinet of the lighting system, nor does installation envisage invasive activities, such as breaking-up of the road surface (as in the case of inductive loops) or installation of additional electronic components (such as in the case of an access point or router for wireless communications).

The above objects are fully achieved by the invention, which is characterized in that it comprises, in combination:

1.) at least one local device (also referred to hereinafter as "sensor" or "optical sensor" or "node"), equipped with means for acquisition of images and/or video streams, as well as means for: continuous and automatic on-board analysis of the set of variables regarding (but not limited to) traffic conditions, state of the weather, and degree of luminance of the stretch of road analysed; real-time determination of the effective operating lighting category of the stretch of road being controlled; adaptive control of the public-lighting system through determination of the optimal profiles of activation of the lighting itself according to the aforesaid operating lighting category; and on-demand control of lighting through real-time variation of the lighting produced by each individual lighting point controlled by the local device itself, wherein said means comprise:

2.) at least one software module for acquisition and processing of the data acquired and extrapolation of the set of variables regarding traffic conditions;

3.) at least one software module for acquisition and processing of data and extrapolation of the set of variables regarding the weather conditions mentioned in point 1;

4.) at least one software module for acquisition and processing of data and extrapolation of the set of variables regarding the degree of luminance and brightness mentioned in point 1;

5.) at least one software module that is able to learn automatically the historic evolution of the aforesaid variables with methods of automatic learning, and predict the future evolution thereof, accordingly determining the operating lighting category envisaged for the stretch of road being controlled;

6.) at least one software module, which, starting from the variables described in point 1 and extracted via the modules described in points 2, 3, and 4, is able to recognise in real time the occurrence of significant events and perform instantaneous prediction of their future evolution, accordingly reacting via real-time re-modulation of the luminous fluxes of the corresponding public-lighting system;

7.) at least one additional software module for each of the following functions: smart parking, road security, urban security in areas subjected to controls on access, and traffic-light control;

8.) at least one software module for real-time adaptation of the software system with respect to the conditions of the environmental scene that change over time, activating various profiles according to the environmental conditions (daytime profile, night-time profile, holiday profile, cloud profile, precipitation profile);

9.) at least one hardware device for acquisition of images or video streams (also referred to hereinafter as "video camera" or "camera") regarding the scene being controlled by the invention, which preferably presents low consumption, with the possibility of mounting interchangeable optical devices with different focal lengths;

10.) at least one electronic board for data processing, connected to the aforesaid video camera and capable of receiving therefrom the images acquired from the scene, designed to enable processing on board the aforesaid software modules described in points 2, 3, 4, 5, 6, 7, and 8; and 11.) at least one container body that is able to protect the aforesaid video camera, data-processing board, and electronic device for data transmission, with a degree of protection preferably of IP66 against entry of dust and liquids, having at least one wall of the aforesaid container body made of vitreous or transparent plastic material.

The local device (or sensor) can be installed either outside or inside the illuminating body without this in any other way altering the basic components that characterize the sensor itself as described previously.

Preferably, to control a stretch of road the system according to invention is not installed in a single unit, but envisages installation of a plurality of devices to create a sensor-network configuration. All the sensors or devices within a given network provide the above functions in a completely autonomous way with respect to the other sensors, without thereby departing from what has been described so far. It is, however, possible for each sensor inside a network of nodes to assume a different role only from the standpoint of data transmission. Preferably, two possible roles are distinguished for a sensor: "slave node" and "master node". A slave node is a node that has all the functions described above for the system according to invention, but transmits the results of its own local analysis only within the network itself. A master node is a node that has all the functions described above for the system according to invention, but is also designed for reception of the data processed by the slave nodes and for subsequent re-transmission of all the data processed outside the network, to a remote server.

Basic to the invention is that the aforesaid electronic components should be housed within a container body, whether it is external and dedicated for the sensor, or corresponding to the container body of the lighting point itself, in the case where the sensor is integrated inside it. The container body is in any case an essential element for protection of the components themselves from atmospheric agents and dust.

Without limiting the generic nature of the container body used, the basic characteristics thereof are the following:

at least one closed space for containing at least one said video camera, at least one said data-processing board, and at least one said board for sensor-data transmission, that may have any shape provided that it is of minimal size with respect to the overall dimensions of the components themselves;

the aforesaid closed space must be delimited at least in part by a transparent wall to enable viewing by said at least one video camera, partially constituted by at least one window designed to guarantee the integrity of the container body; and the aforesaid container body must guarantee an adequate ventilation, and resistance to even extreme variations of temperature and to any formation of condensate that might jeopardize effective operation of the components contained therein.

In particular, in the case where the nodes are installed outside the illuminating body, an essential aspect of the invention is also that the space inside the boxlike container is fluid-tight or guarantees a degree of protection preferably of least IP66 in order to guarantee a high degree of protection with respect to atmospheric agents.

The above and other characteristics, with particular reference to the software algorithms used for providing the functions described so far, will emerge more clearly from the description, which is presented purely by way of non-limiting example with reference to the annexed plates of drawings.

Figure 5:
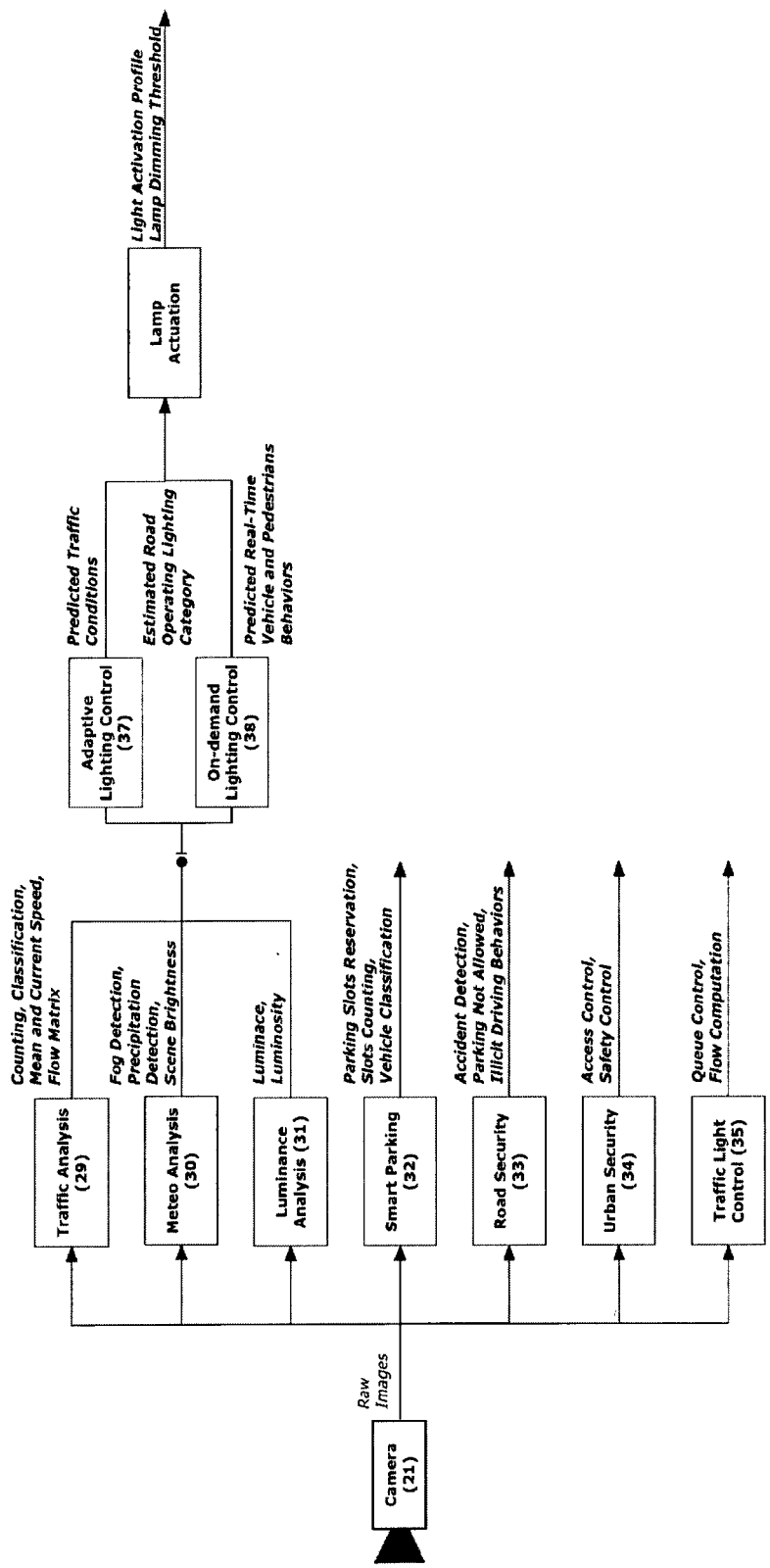
FIG. 5 represents the overall logic flow of the software modules of the invention, with particular reference to the basic functions of the invention: adaptive and on-demand control of public lighting.
Figure 6:
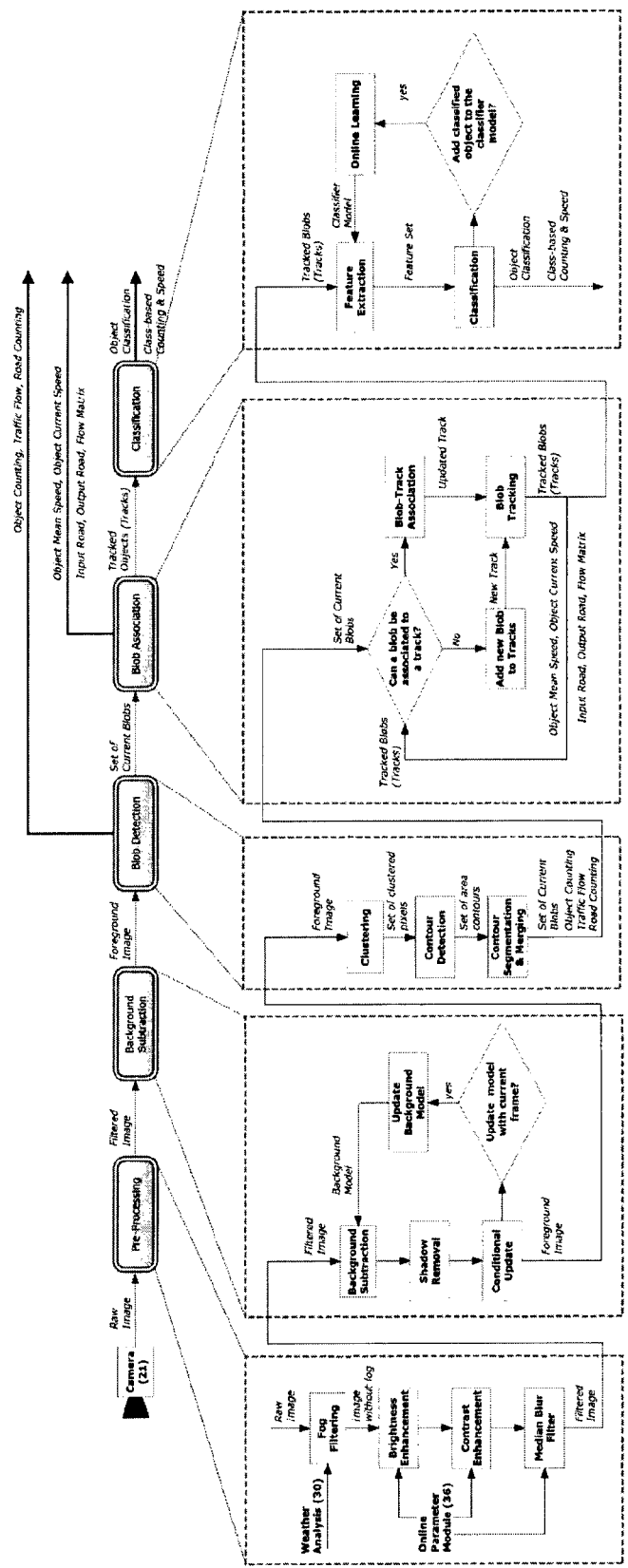
Figure 7:
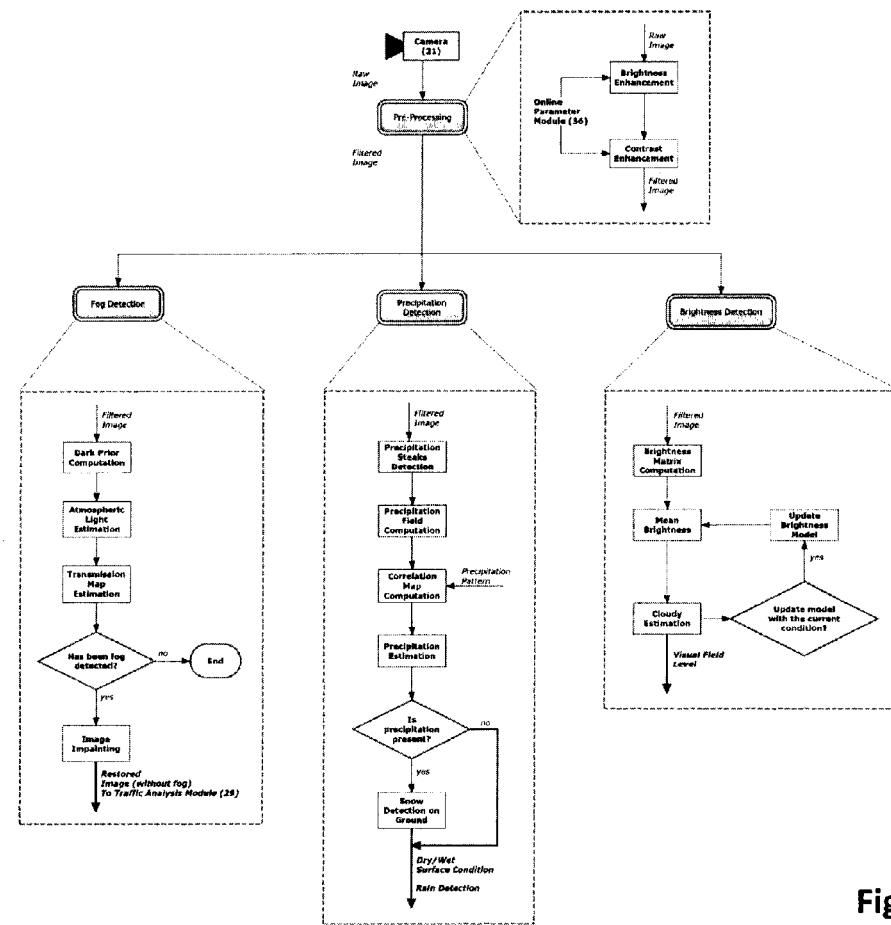
Figure 8:
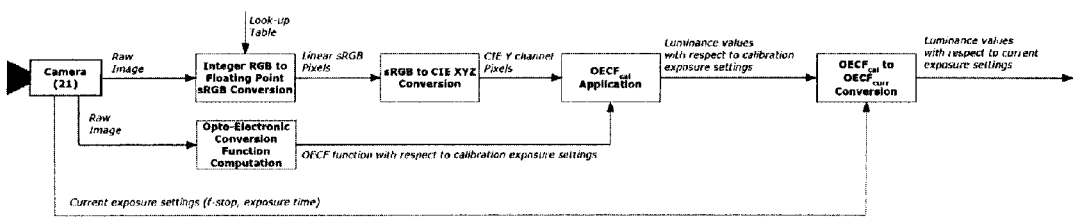
Figure 9:
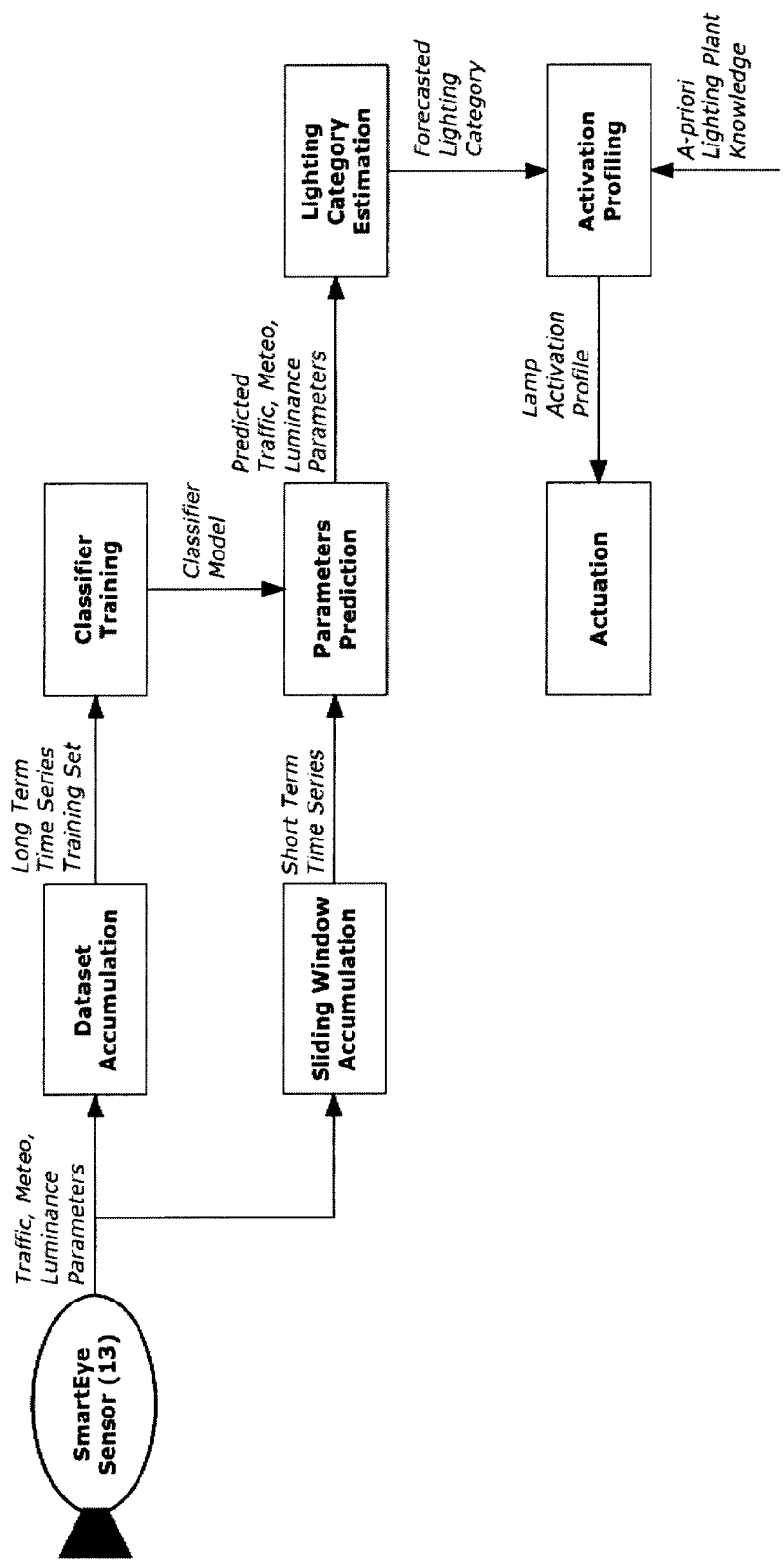
Figure 10:
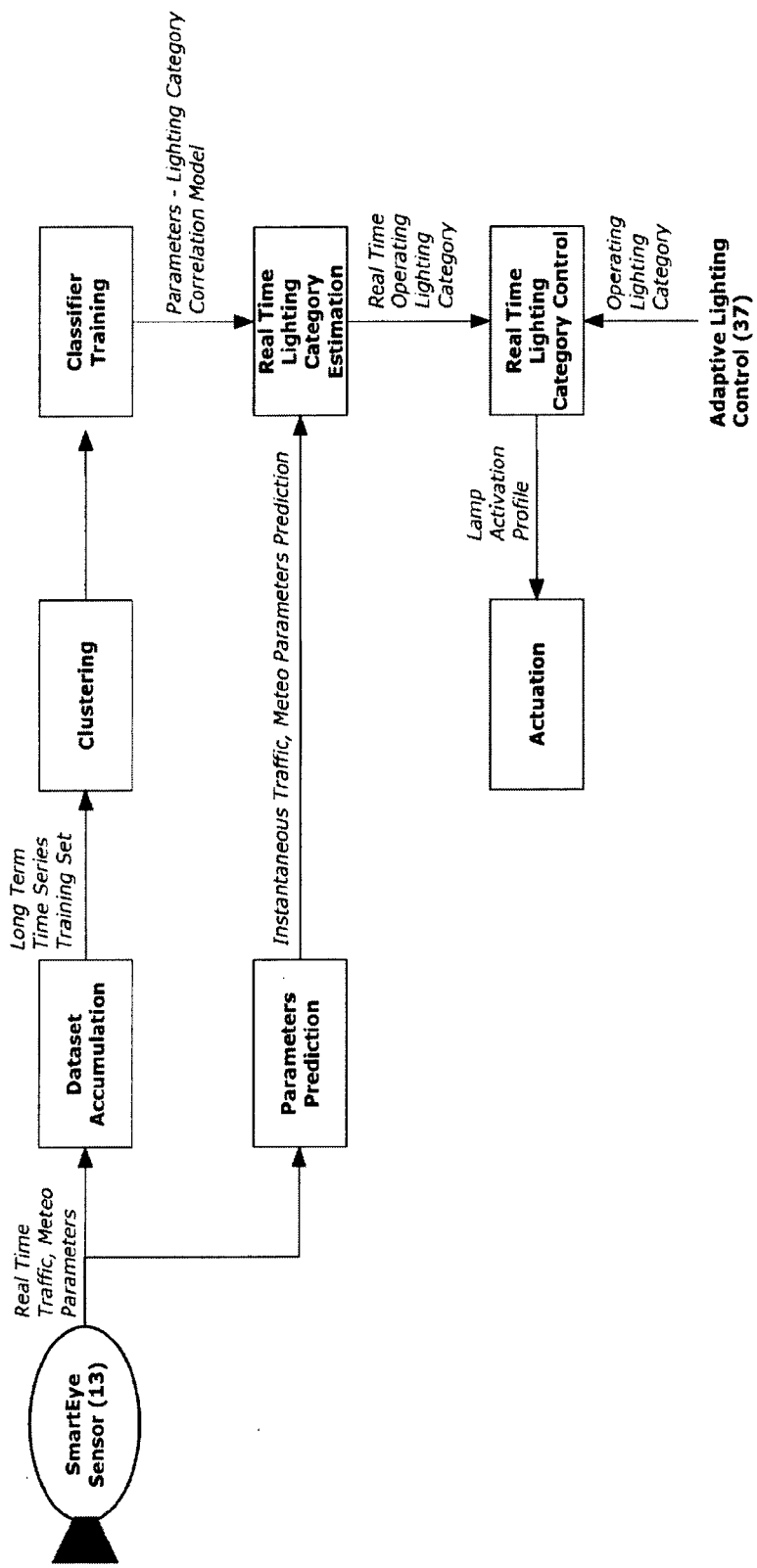

FIGS. 6, 7, and 8 illustrate in detail the first part of the logic flow introduced in FIG. 5, namely, the logical schemes of the software modules on board the nodes responsible, respectively, for analysis of traffic conditions, analysis of weather conditions, and measurement of the degree of luminance; and FIGS. 9 and 10 illustrate in detail the second part of the logic flow introduced in FIG. 5, namely, the logical schemes of the software modules responsible for adaptive control and on-demand control, respectively, of public lighting, which use the parameters of influence previously measured by the sensors for predicting the future evolution thereof, and from this estimate determining the future lighting operating classification of the system.

Figure 1A:
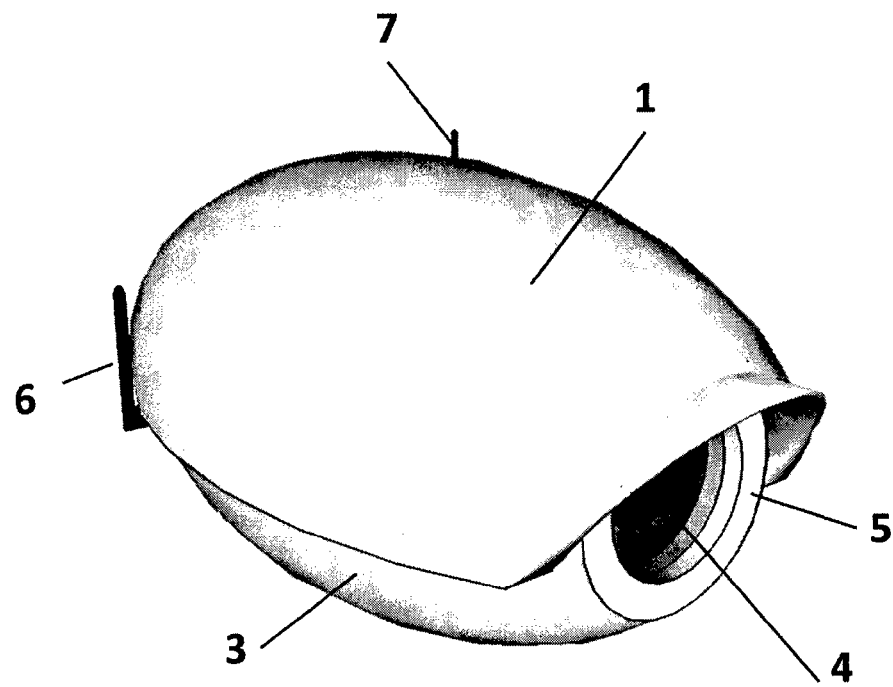
FIGS. 1A and 1B represent two different perspective views of the container body according to the present invention, bringing out the physical features chosen to guarantee a high degree of protection of the casing itself.
Figure 1B:
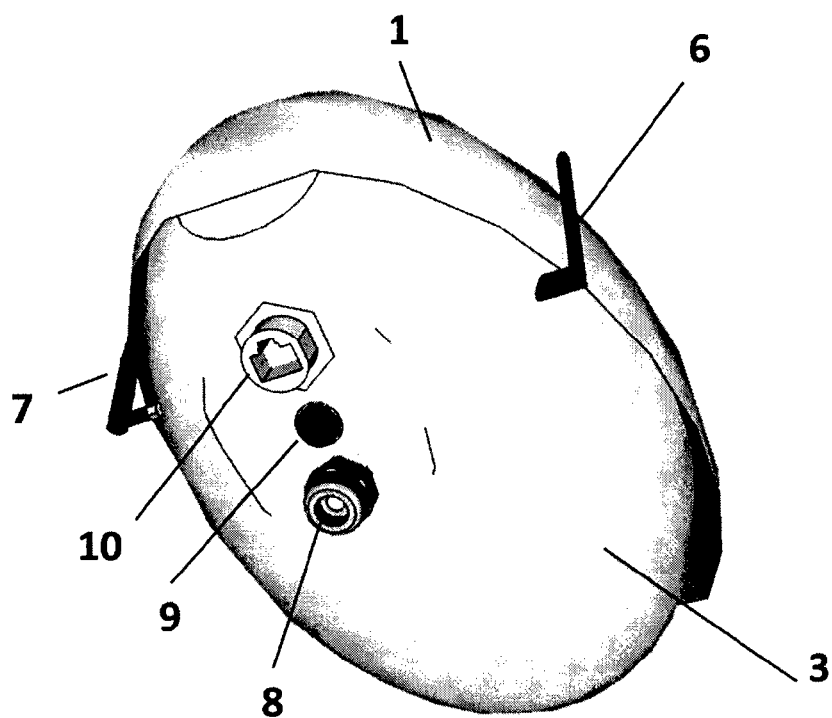

With reference to FIGS. 1A and 1B, the container body represented is made up of: a top half-shell 2 and a bottom half-shell 3; a dome 1 that envelops and protects the top half-shell 2, is anchored thereto, but is set apart therefrom by one centimeter, thus favouring thermal insulation of the internal components from external heat; and an eye 4, which in turn encloses a transparent wall 5 (also referred to as "glass" or "window") preferably made of vitreous or transparent plastic material. The material of the half-shells 2 and 3, the dome 1, and the eye 4 may be of various nature. Preferably, the aforesaid material is plastic or aluminium. The presence of the transparent wall 5 constitutes an essential feature of the invention in so far as it enables the video camera 21 inside the aforesaid container body to acquire the external scene surrounding the node itself.

The bottom shell 3 has a number of holes for installation of external connectors of various nature. In particular, the presence of the connector 8 for electric power supply enables connection of the aforesaid sensor to the electric power supply available in the lamp-post itself, and is the only connection required for installation of the sensor itself.

It is essential for the container body formed by the half-shells 2 and 3 and by the eye 4 to ensure a degree of protection of the components of at least IP66, guaranteeing an adequate protection from atmospheric agents and from the entry of dust, thus preserving the integrity of the internal components. At the same time, on account of the high temperature inside the container body caused by the dissipation of heat of the electrical components, as well as on account of the possibility of formation of condensate on the glass 5, proper aeration of the container body should be favoured.

Figure 2:
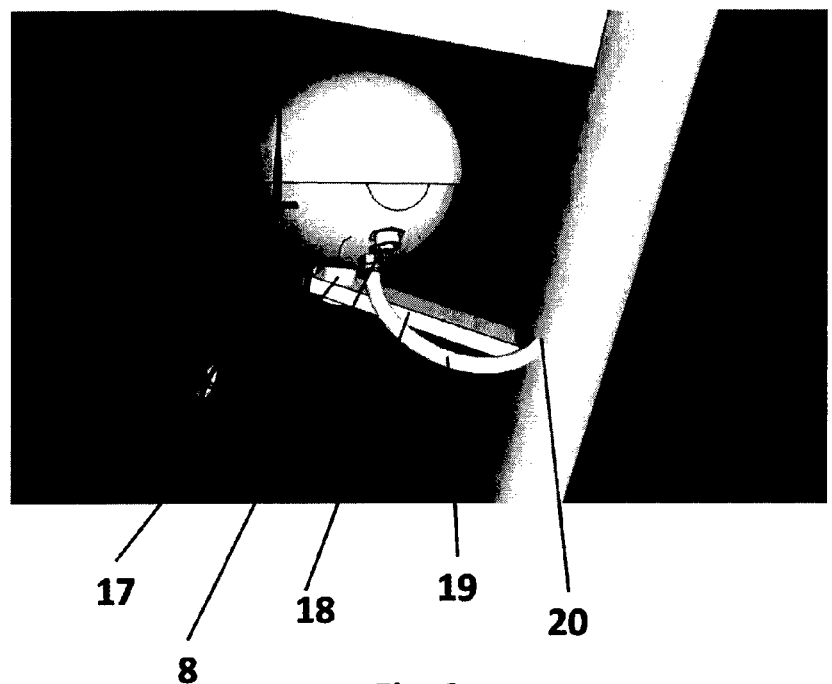
FIG. 2 illustrates a possible mode of installation of the sensor on a public-lighting lamp-post (without thereby limiting the field of installation merely to lamp-posts), highlighting the ease of installation of the invention as compared to other types of sensor (such as, for example, inductive loops)

FIG. 2 illustrates a possible installation of the invention, external to the lamp-post itself, in order to show that a peculiar feature of the invention is the ease of installation. The system according to the invention is connected to the lighting point via an articulated joint 17. The articulated joint 17 is stably engaged to the bottom half-shell 3. The aforesaid articulated joint 17 is connected to an arm provided with a lamp-post adapter 18.

The invention is supplied by means of the electric power supply present within the lamp-post itself, to which the aforesaid node is connected.

Figure 3:
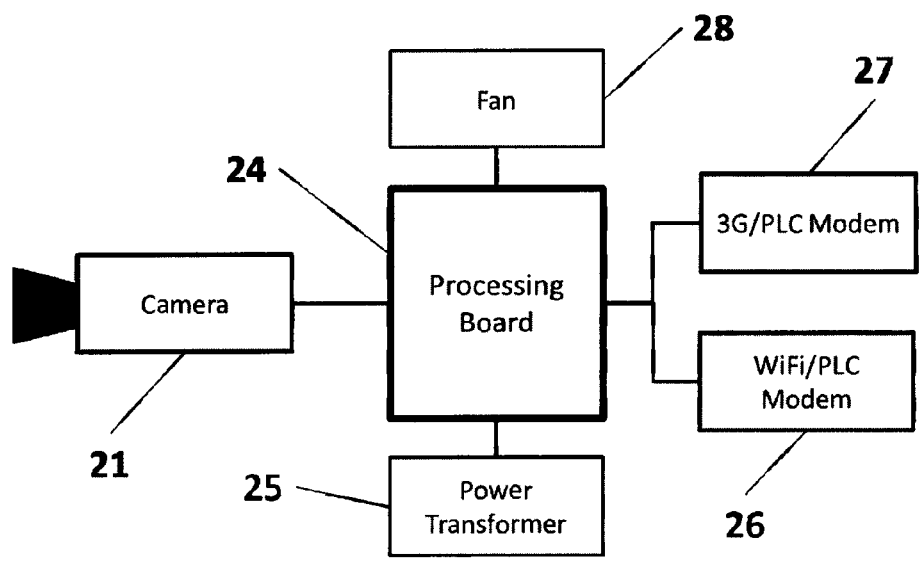
FIG. 3 is the block diagram of the electronic components inside the container body of the sensor referred to previously, according to the present invention, which are essential for on-board execution of the software modules previously described.

FIG. 3 illustrates the internal electrical components of the invention. Purely by way of example, a case of sensor with master role is illustrated, said sensor being equipped with two boards responsible for data transmission, one for communication inside the sensor network, and one for external communication to a remote server.

All the components shown reside inside the closed space delimited by the top half-shell 2 and bottom half-shell 3, the eye 4, and the glass 5. The video camera 21 must be housed in the proximity of the glass 5 in the front part of the closed space in order to be able to acquire the scene without any occlusions or reflections.

The data-processing board 24 is necessarily a low-consumption one in order not to jeopardize the energy saving guaranteed by the invention itself. This board is moreover made up of components that enable at least the following algorithmic optimizations: parallelization of algorithms on multiple processors and dedicated processors (via at least one GPU, preferably also with FPGA or DSP).

The aforesaid board is moreover connected at least to an electronic board 26 or 27 for data transmission.

Figure 4:
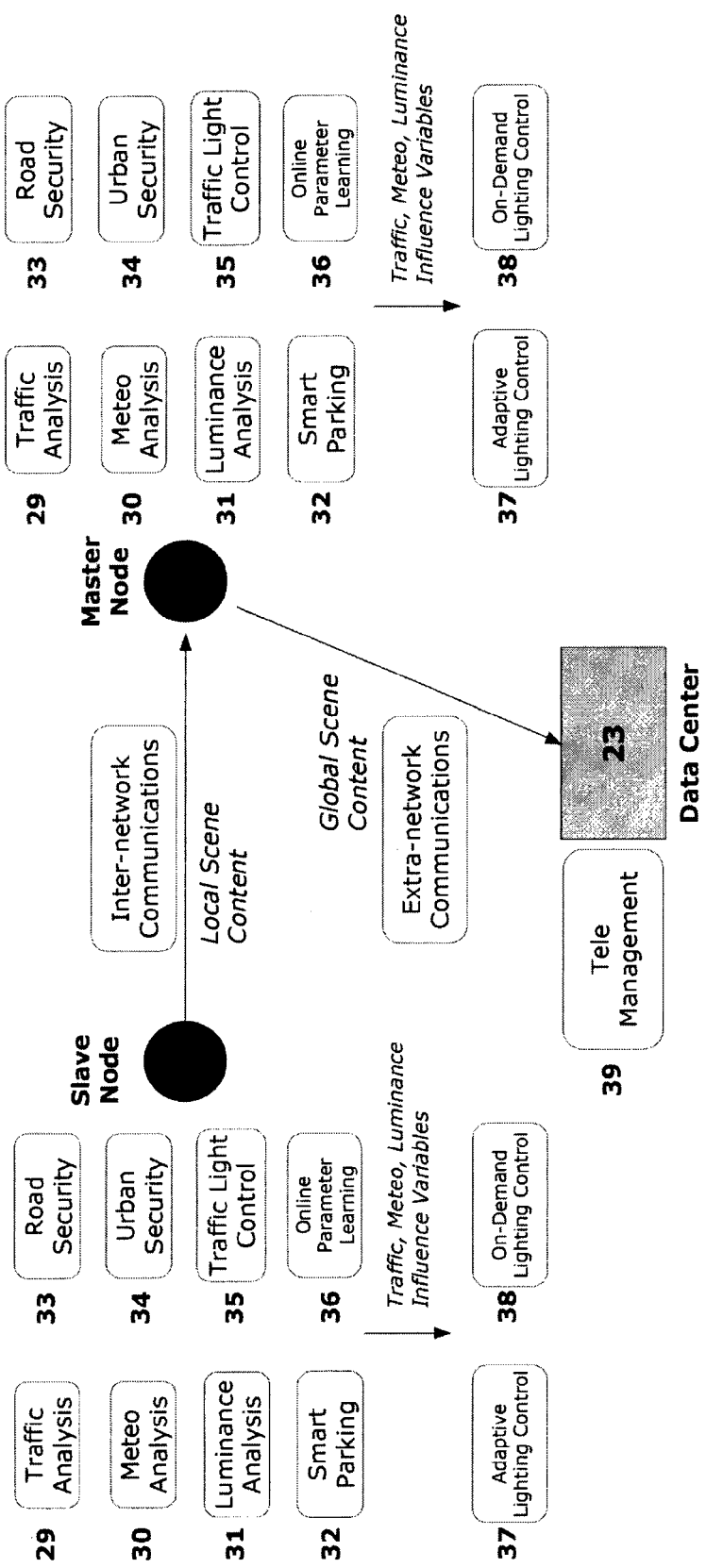
FIG. 4 illustrates the architectural scheme of the software modules on board the invention, with their arrangement within a configuration that, purely by way of example, in the drawing is made up of a slave sensor, a master sensor, and a remote server.

FIG. 4 shows the architectural arrangement of the software modules of the invention. Purely by way of example, a configuration is illustrated that is made up of more than one sensor: a slave sensor 13 and a master sensor 14, both interacting with a remote server 23. More in general, the relation between sensors of one and the same system and the way in which they interact with the remote servers regards exclusively data transmission, is not essential to the invention, and is delegated to the design stage according to the characteristics of the territory.

Starting from acquisition of the local scene via the video camera 21, the continuous video stream is transmitted to the data-processing board 24. Provided on said board are various software modules for local analysis.

Analysis of the variables regarding traffic conditions described in point 2 is carried out by the software module 29 (referred to in the figure as "Traffic Analysis" and illustrated in greater detail in FIG. 6). Analysis of weather conditions described in point 3 corresponds to the software module 30 referred to in FIG. 7 as "Meteo Analysis". Analysis of the degree of luminance of the scene described in point 4 corresponds to the software module 31 represented in FIG. 8 and referred to as "Luminance Analysis".

Once again on board the sensors, the additional functions described previously in point 7 are provided: "Smart Parking" 32, "Road Security" 33, "Urban Security" 34, and "Traffic-Light Control" 35.

In particular, the module Smart Parking 32 manages access to parking lots with or without parking attendants, starting from identification of the lines that define the individual parking slots within a parking lot, or starting from a map provided beforehand. The algorithm monitors the number of occupied and free parking slots, assigns to each new vehicle entering the parking lot a specific parking slot according to the type of vehicle.

The module Road Security 33 automatically recognises anomalous road events. Via tracking of the cars that pass, the algorithm recognises sudden decelerations in stretches where this is unexpected, followed by a queue of vehicles that are stationary beyond a certain lapse of time, and signals any possible accident. The same algorithm, once again via tracking techniques, recognises behaviours that are forbidden by the highway code, such as overtaking a vehicle or making U-turns where not allowed, and parking in no-parking areas, all without human supervision.

The module Urban Security 34 has the job of recognising entry or permanence of objects of interest in areas specifically monitored, which, during the configuration stage, have been defined as restricted areas. Upon occurrence of any anomalous event, the module sends asynchronous notification to the remote server.

The module Traffic-Light Control 35 controls the traffic-light systems in a smart way according to the amount of traffic present in the various intersections, the type of road, and the traffic-light system controlled. The algorithm analyses the number of cars on the road that are standing at the traffic lights and the passage of vehicles and on the basis of this calculates the queues in real time. According to the ratio between the queues on the various stretches of road pertaining to the traffic-light system, the module regulates programming of the states of activation of the traffic-light system.

All the aforesaid algorithms of the scene are usually conditioned by parameters that depend upon the particular operating conditions of the scene itself. The invention is distinguished from the traditional solutions in that it is provided with a module for automatic learning of the scene parameters 36, referred to in point 8, which is able to detect variations in the environmental scene and modify appropriately the parameters of all the aforesaid modules, via the use of given profiles with respect to criteria of times (daytime hours or night-time hours) or of the module Meteo Analysis (clear conditions, presence of fog, precipitations). This bestows upon the invention a high degree of adaptiveness with respect to the environment. Profile switching is automatically determined by the module itself.

The information thus analysed is sent to the modules Adaptive Lighting Control 37 and On-Demand Lighting Control 38.

The aforesaid modules are illustrated in FIGS. 9 and 10.

FIG. 5 illustrates the overall logical scheme of the invention, with particular reference to the basic functions of the invention: adaptive and on-demand control of public lighting. It highlights three conceptual levels of functions cascaded to one another:

the logic flow starts from acquisition of non-processed images of the scene surrounding the sensor, via the video camera 21;

these images are transferred to the data-processing board 24, where the embedded algorithms for analysis of the scene are executed;

according to the services offered by the sensor, the embedded software modules provided are executed for processing the images and obtaining a series of high-level statistical data, having small dimensions, in order to favour possible remote transmission thereof; in particular, essential for the invention are the modules Traffic Analysis 29, Meteo Analysis 30, and Luminance Analysis 31, which together concur in providing the necessary and sufficient set of variables of influence required for control of public lighting;

the second conceptual level of software algorithms receives at input the set of variables of influence processed by the previous software level, and provides services of automatic learning, prediction, and reactive control in the sphere of public lighting; more specifically, the system predicts the operating lighting category of the stretch of road with respect to the conditions of traffic, weather, and luminance learnt over time; the module Adaptive Lighting Control 37 adapts the luminous flux with respect to the future evolution of the traffic and weather conditions; the module On-Demand Lighting Control 38 regulates it in reaction to significant events in real time; the third software level interfaces the predictions made in terms of minimum luminance required with respect to the lighting category and to the specific environmental conditions with the lighting system currently being controlled, defining a profile of activation with respect to each lighting point and to their lighting characteristics.

FIG. 6 illustrates the logical scheme of the software module 29 for extraction of the variables of influence regarding the traffic conditions and referred to in point 2 (also referred to as the module "Traffic Analysis"). The basic methodological steps of data extraction are the following:

an image of the scene being controlled by the sensor is periodically acquired in real time by the video camera 21 and passed to the data-processing board 24;

the same image is pre-processed by removing the possible presence of fog, using the module Meteo Analysis 30;

the resulting image is further improved via three filters: brightness-enhancement filter, contrast-enhancement filter, and median blur filter (the so-called "pre-processing step"); these are configured each time according to the profiles established by the software module for automatic learning of the scene parameters 36;

the resulting image is compared with a historic background model for differentiating any possible moving objects from the background ("background-subtraction" step); the output of this step is a new binary image, where the moving-object candidates are represented in white, and the background in black; the algorithm removes from the foreground also possible shadows ("shadow elicitation"), which represent false positives of moving objects; instead, the algorithm seeks to maintain, as foreground, objects that in the current image are stationary but were previously moving (a technique known as "conditional update");

the binary image produced by the "background subtraction" step is used for the activity of "blob detection", which consists in identifying which areas of foreground can effectively be considered as candidate of objects currently moving in the area of interest (referred to as "blobs"); initially, starting from the foreground, a set of clusters that group together white pixels close to one another ("clustering") is determined; a set of aggregate areas of white pixels is obtained, from which the contours are extracted ("contour detection"); also used are techniques of "contour segmentation" to prevent occlusions between objects from possibly inducing false negatives or false positives; instead, "contour merging" techniques merge two white areas that are too close to be distinct objects, but rather correspond to different parts of one and the same object;

once all the blobs in the current image have been identified, there follows the step of "blob association"; the blobs found in the current image are, that is, compared with the blobs of which the system kept track up to the previous instant (referred to as "tracks"); this enables the system to identify whether there are new objects that have come onto the scene and had never seen before, or else whether the system is following objects already known; in the latter case, the system updates the state of the objects with the information just processed; in the case, instead, of new objects, the system identifies the road that they come from so as to be able to have the first of the two items of information required for determining the flow of the object;

the step of blob association is followed by the step of "blob tracking", which enables the system to follow the evolution and motion of the tracks in time; this activity is fundamental for understanding which road the object is approaching, for understanding when the object exits from the area of interest, for updating the matrix of the flows with the road-entry/road-exit pair, and for detecting the instantaneous and average speed of the object;

the final step is that of "classification", where the object is classified with respect to four possible categories: pedestrian, bicycle/motor cycle, automobile, heavy vehicle (lorry, articulated vehicle, bus, etc.); the heuristics of classification can take into account various salient characteristics for discriminating between the categories; the automatic-learning algorithm may be of the supervised type, non-supervised type, or reinforcement type, and may or may not require an a-priori database.

FIG. 7 illustrates the logical scheme of the software module "Meteo Analysis" 30 for extraction of the variables of influence regarding the weather and described in point 3. The basic methodological steps of data extraction are the following:

an image of the scene being controlled by the sensor is periodically acquired in real time by the video camera 21 and passed to the data-processing board 24;

the resulting image is further improved using two filters: the brightness-enhancement filter and the contrast-enhancement filter; these are each time configured according to the profiles established by the software module for automatic learning of the scene parameters 36;

the resulting image is processed in order to identify the presence of fog in the environment, to extract the maximum distance of visibility useful for the visual task of the stretch considered, and possibly to remove it from the image to the benefit of the other software modules; the output of this processing operation is then passed to the aforesaid module for processing traffic variables—the module Traffic Analysis; fog recognition is obtained by exploiting a characteristic of the images known as "dark prior"; starting from the pre-processed image, the dark prior is computed for each pixel of the image ("dark-prior computation"). Next, the brightness of the sky corresponding to fog is determined ("atmospheric-light estimation"); finally, the dark prior normalized with respect to the value of atmospheric light determines the relation between the pixels of the image and the intensity of the fog present on the scene ("transmission-map estimation"); the result of this processing operation enables determination of whether the image presents fog or not; once the condition of fog has been recognised, a technique of "image inpainting" reconstructs the image without fog;

the resulting image is processed for extracting meteorological information on the weather; the possible presence of atmospheric agents having the nature of precipitation (rain, hail, snow) is determined; precipitations are perceived in the image as patterns with very small dimensions, evenly distributed over the entire image, which move from top down at a very high speed and repeat at a very high rate; to capture this dynamics the module resorts to a model of correlation with patterns that characterize the precipitations and estimates the likelihood of occurrence of a precipitation; starting from the pre-processed image, the algorithm extracts signals in the time domain that present characteristics congruent with the pattern of precipitation considered, which are considered as candidates of individual drops of precipitation ("precipitation-streaks detection"); from the image thus obtained the directions of the candidate drops are correlated with respect to one another to obtain a gradient of the direction of the precipitation ("precipitation-field computation"); finally, starting from the set of drops, a correlation map is computed ("correlation-map computation"), which is applied over the entire image via "sliding window" to verify the uniformity of the precipitation ("precipitation estimation");

once the possible condition of precipitation has been recognised, the module analyses the degree of brightness of the background of the image, carrying out a chromatic filtering to detect a high presence of white, which indicates the possible presence of snow on the ground;

from the same image a further analysis of brightness is conducted, this time with respect to a historic model of brightness, updated periodically over time in a way similar to what happens for the background model used by the module Traffic Analysis 29; this model enables association of the mean index of brightness of the current image with respect to the expected conditions of brightness in the case of a clear sky or a cloudy sky for the time interval considered, and estimation of which of the two conditions is more reliable.

FIG. 8 represents the logical scheme of the module Luminance Analysis 31 for acquisition of the variables of influence regarding the degree of luminance. The basic steps of the methodology of data extraction adopted by the invention are the following:

the sensor is subjected to a calibration procedure, the result of which is the regression of a curve referred to as "opto-electronic conversion function" (OECF), which sets in relation the values recorded by a digital videosensor with the luminance signal; this curve has the characteristic of varying as the parameters of exposure vary;

a new image of the scene is acquired by the video camera 21; from this image, acquired in the RGB colour space, where each colour channel is encoded in integer values between 0 and 255, a look-up-table (LUT) is applied for converting them into an sRGB colour space, where the values are floating-point values comprised between 0.0 and 1.0;

the values thus converted into sRGB are transformed into the CIE XYZ colour space;

the CIE Y channel is used to obtain the value of luminance in the corresponding pixel by applying the function OECF found in the calibration stage;

the value of luminance thus obtained, which is specific for exposure values equal to the ones in the calibration stage, is finally re-calculated with respect to the exposure values when the current image was acquired to obtain a new value, this time pertaining to the current case.

FIG. 9 represents the logical scheme of the software module Adaptive Lighting Control 37. The basic steps of the methodology of data extraction are the following:

the sensor accumulates over time the data derived by the modules Traffic Analysis 29, Meteo Analysis 30, and Luminance Analysis 31;

accumulation of the above data constitutes historic series, with particular reference to (but not limited to) the evolution of the variables of moving traffic flow (determined by the module Traffic Analysis 29), the presence of conditions of wet/dry road surface, the presence of cloud (determined by the module Meteo Analysis 30), and the degree of luminance (measured by the module Luminance Analysis 31);

in a preliminary step, these historic series form the set of data for training an automatic classifier, which is trained for a period preferably of at least three months, the aforesaid automatic classifier is implemented preferably using techniques such as artificial neural networks;

once the classifier has been trained, it receives at input the values analysed in real time by the modules Traffic Analysis 29, Meteo Analysis 30, and Luminance Analysis 31, together with the instant of analysis (date and time), and predicts at output the future evolution (for example, for the next hour) of the parameters of influence considered by the historic series;

prediction of the parameters of influence determines the possibility of declassing or super-classing the current lighting category, providing the prediction of the future operating lighting category for the stretch of road considered;

starting from the new lighting category, the module processes the profile of activation of the public lighting system that is being controlled so as to provide the minimum degree of luminance required by the aforesaid category.

FIG. 10 represents the logical scheme of the software module On-Demand Lighting Control 38. This module has the purpose of carrying out control of public lighting upon occurrence of events that require a timely reaction. The basic steps of the data-processing methodology are the following:

the sensor in this case reacts in real time to events considered important, such as a pedestrian/vehicle approaching the stretch of road being monitored;

the module receives real-time data on the position, direction, and speed of the moving objects present on the scene, through analysis made by the module Traffic Analysis 29;

the module is likewise also made up of an automatic classifier, trained during a preliminary stage, which recognises the lighting category of the road in question;

starting from the data arriving in real time, the module estimates the path of the moving objects, predicting the future position and analyses the behaviour thereof;

according to the outcome of the prediction, and to the lighting category established by the automatic classifier, the module reacts immediately by altering the activation profile set by the adaptive control in order to maintain the minimum degree of luminance required by the unexpected event.

The invention claimed is:

1. A smart apparatus for adaptive, predictive, and on-demand control of public lighting, characterized in that it comprises at least one local device, equipped with optical means for acquisition of images and/or video streams, data-processing means, as well as further means for:
   continuous and automatic on-board analysis of the set of variables regarding at least traffic conditions, weather conditions, and degree of luminance of the stretch of road being analysed;
   real-time determination of the effective operating lighting category of the stretch of road being controlled;
   adaptive control of the public-lighting system, through determination of the optimal profiles of activation of the lighting itself, according to the aforesaid operating lighting category; and
   on-demand control of lighting through real-time variation of the light produced by each individual lighting point controlled by the local device itself;
wherein said further means comprise:
   at least one first software module for acquisition and processing of the data acquired and extrapolation of the set of variables regarding the traffic conditions mentioned in the previous point, which will offer at least the following functions: acquisition of images via videosensor; automatic learning of a historic model of the background of the scene acquired; segmentation of the moving objects present on the scene; counting of the moving objects present on the stretch of road being controlled; measurement of their instantaneous and average speed; classification of the type of moving objects (pedestrians, two-wheeled vehicles, motor vehicles, heavy vehicles); analysis of the origin and destination of the moving objects; tracking of the moving objects; determination of the direction of entry and exit of each moving object, which in turn enables processing of the matrix of the flow of vehicles and/or pedestrians for the stretch of road analysed; and counting of parked vehicles;
   at least one second software module for acquisition and processing of the data, and extrapolation of the set of the aforesaid variables regarding the weather, affording at least the following functions: acquisition of images via videosensor; recognition of the presence of fog and consequent removal thereof from the image acquired; computation of the maximum distance of visibility as a function of the amount of fog present; recognition of precipitations, such as rain, hail, snow, for determining the condition of the surface of the stretch of road, such as wet or dry; analysis of the condition of cloud on the scene for estimation of the visual task;
   at least one third software module for acquisition and processing of the data and extrapolation of the set of the aforesaid variables regarding the degree of luminance and brightness, affording at least the following functions: acquisition of images via videosensor; calibration of the sensor itself in order to correlate the intensity of the pixels of the image acquired with the corresponding luminance on the scene, after prior regression of a function that correlates the two variables considered; measurement of the luminance of the scene via a procedure that can be applied indifferently to any digital videosensor, such as for example: CMOS, CCD, with HDR, etc., which uses the function obtained in the calibration stage, the current settings of exposure of the sensor and the values of brightness of the pixels in the current image to derive the luminance of each point corresponding to the pixel on the scene; automatic learning of a historic model regarding the brightness of the scene; indirect measurement of the degree of brightness of the scene with respect to the historic model; and measurement of the colour-rendering index (CYI);
   at least one fourth software module, which, starting from the aforesaid variables extracted via said first, second, and third modules, is able to learn automatically the historic evolution of the aforesaid variables with methods of automatic learning, and predict the future evolution thereof, accordingly determining the operating lighting category provided for the stretch of road being controlled; said module regulating the luminous flux of the corresponding lighting system being managed, in an adaptive way with respect to the effective traffic conditions, and in compliance with the minima of luminance required for the aforesaid category; and
   at least one fifth software module, which, starting from the aforesaid variables regarding at least traffic conditions, weather conditions, and degree of luminance of the stretch of road analysed, is designed for real-time recognition of the occurrence of significant events and instantaneous prediction of their future evolution, reacting accordingly via real-time re-modulation of the luminous fluxes of the corresponding public-lighting system, with the aim of guaranteeing the minimum degree of luminance required by the standards, favouring energy saving, and increasing the safety of the stretch of road.

2. The apparatus according to claim 1, characterized in that: said optical means envisage at least one hardware device, such as for example a video camera or photographic camera, for acquisition of images or video streams regarding the scene being controlled, which is preferably of the low-consumption type and preferably has the possibility of mounting interchangeable optics with different focal lengths; and at least one electronic board is provided for processing the data, which is connected to the aforesaid video camera and is able to receive therefrom and process in real time the images acquired from the scene, said electronic board being designed to enable processing on board the aforesaid software modules.

3. The apparatus according to claim 1, characterized in that it envisages at least one fifth software module for real-time adaptation of the software system with respect to the conditions of the environmental scene, which change over time, wherein, via algorithms of automatic learning, said software module is able to re-parameterize its own algorithms in order to adapt to the scene and activate different profiles according to the environmental conditions, such as for example: daytime profile, night-time profile, holiday profile, cloud profile, precipitation profile.

4. The apparatus according to claim 3, characterized in that said data-processing board is the electronic component provided for execution of all the software modules that reside on board the apparatus.

5. The apparatus according to claim 3, characterized in that said data-processing board is connected at least to a data-transmission electronic board of a wireless or wired type.

6. The apparatus according to claim 1, characterized in that it envisages at least one additional software module for each of the following functions: smart parking, road security, urban security in restricted areas, traffic-light control.

7. The apparatus according to claim 1, characterized in that it envisages at least one electronic device for transmission of data processed by one sensor to other sensors or to a remote centre via any wireless or wired communication means.

8. The apparatus according to claim 1, characterized in that it envisages at least one container body that is able to protect said optical means, said data-processing board, and said electronic device for data transmission, with a degree of protection from entry of dust and liquids adequate for the type of use, such as for example IP66.

9. The apparatus according to claim 8, characterized in that said container body envisages at least one closed space for containing at least one video camera, at least one data-processing board, and at least one board for transmission of processed data, said container being of any shape, provided that it is of minimal size with respect to the overall dimensions of the components themselves, wherein:
- said closed space is delimited at least in part by a transparent wall to enable viewing by said video camera;
- said transparent wall is at least partially constituted by a glass or window designed to guarantee integrity of the container body and to prevent formation of condensate on the wall itself;
- said video camera is located in the proximity of the glass in the front part of the closed space in order to be able to acquire the images or the video streams of the scene framed without occlusions or reflections; and
- said container body is designed to guarantee adequate ventilation, resistance to even extreme variations of temperature and to formations of condensate that might jeopardize effective operation of the components contained therein.

10. The apparatus according to claim 8, characterized in that the container body is made up of a top half-shell and a bottom half-shell, a dome that envelops and protects the top half-shell, anchored to the half-shells, at an appropriate distance for favouring insulation of the internal components from external heat, and an eye, which in turn encloses a transparent wall preferably made of vitreous or transparent plastic material.

11. The apparatus according to claim 10, characterized in that said bottom shell is provided with various holes for installation of external connectors of various nature, as well as in that a connector is provided for electric power supply that enables supply of the apparatus itself by connecting it to the electric power supply available in the lamp-post to which it is fixed, said connector being just the connection required for installation of the apparatus also in the case where the data-communication means used is a powerline communication means (PLC).

12. The apparatus according to claim 10, characterized in that to favour proper aeration of the container body, without increasing the overall electrical consumption, the top half-shell is purposely provided with holes in order to provide vents for passive ventilation inside the container body; it being appropriate for said holes to be made exclusively on the top half-shell, which is protected by the dome.

13. The apparatus according to claim 10, characterized in that, in the case of installation on a lamp-post along a road equipped with lighting point, an articulated joint is provided with means for engagement to the lighting point that is stably fixed to the bottom half-shell via a screw provided with a corresponding nut, wherein said articulated joint is connected to an arm provided with a lamp-post adapter.

14. The apparatus according to claim 1, characterized in that it envisages that all the electronic components are housed within the container body, which may be external and dedicated for the apparatus itself or else may correspond to the container body of the lighting point, in the case where the apparatus is integrated inside it.

15. The apparatus according to claim 1, characterized in that said data-processing board is made up of components that enable at least the following algorithmic optimizations thereof:
- parallelization of algorithms on a number of processors via a multi-core processor with at least two cores, preferably four cores;
- dedicated processors, via at least one GPU, preferably also with FPGA or DSP; and
- vectorization of arithmetical operations, for example a NEON unit.

16. The apparatus according to claim 1, characterized in that it envisages one or more additional software modules, chosen from among the following:
- smart parking;
- road security;
- urban security; and
- traffic-light control.

* * * * *